(12) United States Patent
Ye

(10) Patent No.: US 11,022,743 B2
(45) Date of Patent: Jun. 1, 2021

(54) BACKLIGHT SOURCE COMPRISING LIGHT GUIDE PLATE AND LIGHT BAR, AND DISPLAY DEVICE COMPRISING THE BACKLIGHT SOURCE

(71) Applicant: BOE TECHNOLOGY GROUP CO., LTD., Beijing (CN)

(72) Inventor: Huiqiang Ye, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/629,289

(22) PCT Filed: May 17, 2019

(86) PCT No.: PCT/CN2019/087369
§ 371 (c)(1),
(2) Date: Jan. 7, 2020

(87) PCT Pub. No.: WO2019/223611
PCT Pub. Date: Nov. 28, 2019

(65) Prior Publication Data
US 2021/0026060 A1    Jan. 28, 2021

(30) Foreign Application Priority Data

May 25, 2018   (CN) .......................... 201820800533.1

(51) Int. Cl.
*F21V 8/00*    (2006.01)
(52) U.S. Cl.
CPC .......... *G02B 6/0031* (2013.01); *G02B 6/002* (2013.01); *G02B 6/0028* (2013.01); *G02B 6/0066* (2013.01)

(58) Field of Classification Search
CPC ...... G02B 6/002; G02B 6/028; G02B 6/0031; G02B 6/0066; G02B 6/00; G02B 6/006
See application file for complete search history.

(56) References Cited

U.S. PATENT DOCUMENTS

| | | | | |
|---|---|---|---|---|
| 5,808,708 | A | * | 9/1998 | Oyama ................ G02B 6/0018 349/65 |
| 2009/0201698 | A1 | * | 8/2009 | Klick ..................... G02B 6/002 362/555 |

(Continued)

FOREIGN PATENT DOCUMENTS

| CN | 101403807 A | 4/2009 |
|---|---|---|
| CN | 204153587 U | 2/2015 |

(Continued)

*Primary Examiner* — Alan B Cariaso
(74) *Attorney, Agent, or Firm* — The Webb Law Firm

(57) ABSTRACT

The present disclosure discloses a backlight source and a display device. The backlight source can include: a light guide plate and a light bar. The light guide plate includes a flat panel structure and a strip structure having an inclined surface, the strip structure being disposed at an edge of one side of the flat panel structure, the inclined surface being connected to the edge of the flat panel structure and inclining toward the flat panel structure, and the angle between the inclined surface and a side of the strip structure away from the flat panel structure and parallel to the flat panel structure being an obtuse angle; the light bar and the strip structure are disposed on the same side of the flat panel structure, a light exiting surface of the light bar facing a side of the strip structure opposite to the inclined surface in a direction parallel to the flat panel structure. The backlight source of the present disclosure is used in a display device including a display panel.

16 Claims, 3 Drawing Sheets

(56) References Cited

U.S. PATENT DOCUMENTS

| | | | |
|---|---|---|---|
| 2009/0290328 A1 | 11/2009 | Ueyama | |
| 2010/0118563 A1 | 5/2010 | Shen et al. | |
| 2012/0249921 A1* | 10/2012 | Yu | G02B 6/0031 349/62 |
| 2013/0335674 A1* | 12/2013 | Hu | G02B 6/0013 349/64 |
| 2014/0340931 A1* | 11/2014 | Nishitani | G02B 6/0061 362/609 |
| 2018/0203297 A1* | 7/2018 | Funakura | G02B 6/0068 |

FOREIGN PATENT DOCUMENTS

| | | |
|---|---|---|
| CN | 205139530 U | 4/2016 |
| CN | 106569298 A | 4/2017 |
| CN | 208156229 U | 11/2018 |
| TW | 201018972 A | 5/2010 |
| WO | 2007122758 A1 | 11/2007 |

\* cited by examiner

BACKLIGHT SOURCE COMPRISING LIGHT GUIDE PLATE AND LIGHT BAR, AND DISPLAY DEVICE COMPRISING THE BACKLIGHT SOURCE

CROSS-REFERENCE TO RELATED APPLICATIONS

This application is a U.S. National Stage under 35 U.S.C. § 371 of International Application No. PCT/CN2019/087369, as filed on May 17, 2019, which claims a priority of a Chinese patent application No. 201820800533.1 that was filed on May 25, 2018, and the contents disclosed in each of these applications are incorporated herein by reference in its entirety.

TECHNICAL FIELD

The present disclosure relates to a backlight source and display device.

BACKGROUND

In order to increase users' comfort in using display devices, the screen size of the display devices is getting larger and larger, and the overall size of the display devices also becomes larger with the screen size. However, a size of the entire display device exceeding a certain size may not only affect the user's using effect, but also affect the user's visual effect. Therefore, it is necessary to reduce the size of the bezel around the screen, such that the overall size of the display device is not too large.

A backlight source is generally disposed in the liquid crystal display device, which may include a direct type backlight source and a side-in type backlight source. The side-in backlight source may include a light guide plate and a light bar. The light bar usually abuts a side surface of the light guide plate, and light emitted by the light bar can pass through the side surface of the light guide plate and exit from one side of the light guide plate.

If a side-in backlight source is provided in the display device, it is required to shield the light bar of the side-in backlight source with the bezel of the display device.

SUMMARY

The present disclosure provides a backlight source, comprising:

a light guide plate and a light bar;

the light guide plate includes a flat panel structure and a strip structure having an inclined surface, the strip structure being disposed at an edge of one side of the flat panel structure, the inclined surface being connected to the edge of the flat panel structure and inclining toward the flat panel structure, and an angle between the inclined surface and a side of the strip structure away from the flat panel structure and parallel to the flat panel structure being an obtuse angle;

the light bar and the strip structure are disposed on the same side of the flat panel structure, alight exiting surface of the light bar facing a side of the strip structure opposite to the inclined surface in a direction parallel to the flat panel structure.

According to one or more embodiments of the present disclosure, a first reflective strip is disposed on the inclined surface, and a second reflective strip is disposed on a side of the flat panel structure away from the strip structure.

According to one or more embodiments of the present disclosure, a third reflective strip is disposed on the surface of the strip structure away from the flat panel structure and parallel to the flat panel structure, and a fourth reflective strip is disposed on a side surface of the flat panel structure adjacent to the inclined surface.

According to one or more embodiments of the present disclosure, a length direction of the light bar is parallel to a length direction of the strip structure.

According to one or more embodiments of the present disclosure, a length direction of the strip structure is parallel to a width direction of the flat panel structure, and a length of the strip structure is the same as a width of the flat panel structure.

According to one or more embodiments of the present disclosure, the strip structure is integral with the flat panel structure.

According to one or more embodiments of the present disclosure, the light exiting surface of the light bar abuts against the side of the strip structure opposite to the inclined surface in a direction parallel to the flat panel structure.

According to one or more embodiments of the present disclosure, the angle is 135 degrees.

According to one or more embodiments of the present disclosure, the backlight source further has an optical film, a light-shielding tape, a plastic-metal integral structure, and a reflective sheet;

the optical film is disposed on a side of the flat panel structure away from the strip structure;

the light-shielding tape is disposed at an edge of the optical film on a side thereof away from the flat panel structure, the light-shielding tape being in contact with a region of the flat panel structure that is not covered by the optical film;

the plastic-metal integral structure is provided with a light bar mounting groove and a light guide plate mounting groove, the light bar being disposed in the light bar mounting groove, and the light guide plate being disposed in the light guide plate mounting groove;

the reflective sheet is disposed on a side of the flat panel structure adjacent to the strip structure.

The present disclosure provides a display device comprising: a display panel and a backlight source according to the first aspect.

BRIEF DESCRIPTION OF THE DRAWINGS

In order to more clearly explain the technical solution of the present disclosure, a brief introduction will be given below for the drawings required to be used in the description of the embodiments of the present disclosure. It is obvious that, the drawings illustrated as follows are merely some of the embodiments of the present disclosure. For a person skilled in the art, other drawings may also be acquired according to such drawings on the premise that no inventive effort is involved.

DETAILED DESCRIPTION

In order to make the objective, technical solution and advantage of the present disclosure more clear and obvious, embodiments of the present disclosure will be described in detail with reference to the accompanying drawings hereinafter.

Figure 1:
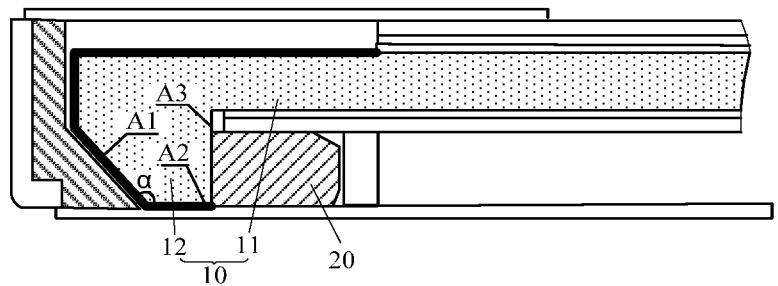
FIG. 1 is a schematic structural diagram of a backlight source provided in an embodiment of the present disclosure.

Referring to FIG. 1, FIG. 1 is a schematic structural diagram of a backlight source provided in an embodiment of the present disclosure. The backlight source can include a light guide plate 10 and a light bar 20.

Figure 2:
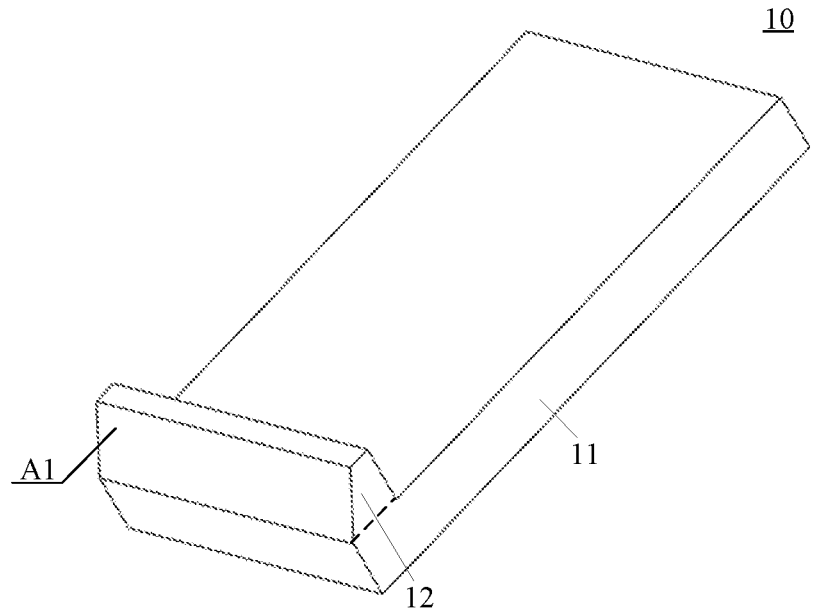
FIG. 2 is a schematic structural diagram of a light guide plate provided in an embodiment of the present disclosure.

The light guide plate 10 can include a flat panel structure 11 and a strip structure 12 having an inclined surface A1, the strip structure 12 being disposed at an edge of one side of the flat panel structure 11. Referring to FIG. 2, FIG. 2 is a schematic structural diagram of a light guide plate provided in an embodiment of the present disclosure. The inclined surface A1 is a surface on which a long side of the strip structure 12 is located, and the inclined surface A1 is connected to the edge of the flat panel structure and is inclined toward the flat panel structure 11. As shown in FIG. 1, the angle α between the inclined surface A1 and the surface A2 of the strip structure 12 away from and parallel to the flat panel structure 11 is an obtuse angle.

Referring to FIG. 1, the light bar 20 and the strip structure 12 are disposed on the same side of the flat panel structure 11, and the light exiting surface of the light bar 20 faces the side A3 of the strip structure 12 opposite to the inclined surface A1 in a direction parallel to the flat panel structure 11, so that the light emitted by the light bar 20 can be reflected by the inclined surface A1, and the reflected light passing through the flat panel structure 11 exits from a side of the flat panel structure 11 away from the strip structure 12, that is, from the light exiting side of the light guide plate 10.

In the embodiment of the present disclosure, since the light bar 20 in the backlight source is located on a side away from the light exiting side of the light guide plate 10, the bezel of the display device does not need to shield the light bar 20, thereby effectively reducing the width of the bezel of the display device. In addition, since the light emitted by the light bar 20 needs to be reflected before entering the flat panel structure 11, the light transmission distance is increased, so that the light emitted by the light bar 20 can be sufficiently mixed. Accordingly, it is no longer necessary to shield the diffusion width of the diffusion sheet 41 and the assembly gap of the diffusion sheet, effectively reducing the width of the bezel of the display device.

Figure 3:
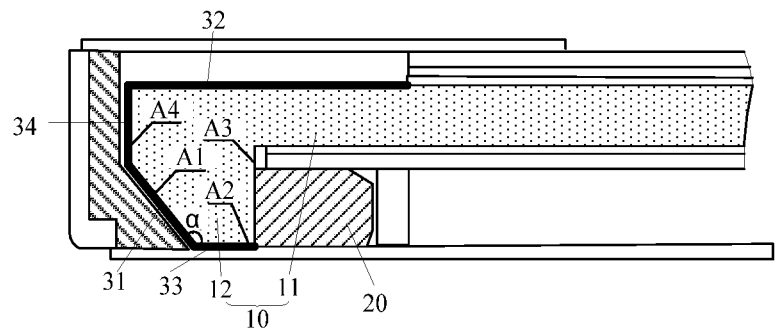
FIG. 3 is a schematic structural diagram of a backlight source provided in an embodiment of the present disclosure.

In the embodiment of the present disclosure, in order to improve the light emitting efficiency of the backlight source, FIG. 3, which is a schematic structural diagram of another backlight source provided in an embodiment of the present disclosure, is provided. A first reflective strip 31 is disposed on the inclined surface A1 of the strip structure 12, and a second reflective strip 32 is disposed on a side of the flat panel structure 11 away from the strip structure. The light emitted by the light bar 20 can be reflected into the flat panel structure 11 by the first reflective strip 31 and the second reflective strip 32, so that the light of the light bar 20 is prevented from exiting from the inclined surface A1 or a side of the flat panel structure 11 away from the strip structure 12, thereby effectively improving the light exiting efficiency of the backlight source.

According to one or more embodiments of the present disclosure, the angle α between the inclined surface A1 and the side A2 of the strip structure 12 away from the flat panel structure 11 and parallel to the flat panel structure can be 135 degrees. In this case, most of the light emitted by the light bar 20 can be reflected into the flat panel structure 11 by the first reflective strip 31 and the second reflective strip 32, and thereby the reflection effect of the inclined surface A1 is improved.

In one or more embodiments according to the present disclosure, as shown in FIG. 3, a third reflective strip 33 can be disposed on a side A2 of the strip structure 12 away from the flat panel structure 11 and parallel to the flat panel structure 11, and a fourth reflective strip 34 can also be disposed on a side surface A4 of the flat panel structure 11 adjacent to the inclined surface A1. The third reflective strip 33 and the fourth reflective strip 34 can effectively prevent the light emitted by the light bar 20 from exiting from the plane A2 and the plane A4, thereby further improving the light emitting efficiency of the backlight source.

Figure 4:
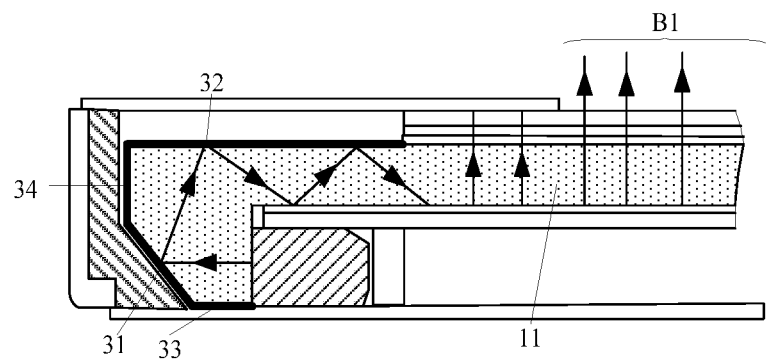
FIG. 4 is a light path diagram of the backlight source shown in FIG. 3.

For example, referring to FIG. 4. FIG. 4 is a light path diagram of the backlight source shown in FIG. 3. The light emitted by the light bar 20 can be reflected by the first reflective strip 31, the second reflective strip 32, the third reflective strip 33, and the fourth reflective strip 34. The reflected light passes through the flat panel structure 11 and exits from the side B1 of the flat panel structure 11 away from the strip structure 12.

According to one or more embodiments of the present disclosure, as shown in FIGS. 2 and 3, the length direction of the light bar 20 can be parallel to the length direction of the strip structure 12. In this case, the light emitted by the light bar 20 can enter the strip structure 12 uniformly.

According to one or more embodiments of the present disclosure, the light exiting surface of the light bar 20 can abut against the side A3 of the strip structure 12 opposite to the inclined surface A1. In this case, the light emitted by the light bar 20 can be completely transmitted into the strip structure 12, thereby effectively improving the light exiting efficiency of the backlight source.

According to one or more embodiments of the present disclosure, the length direction of the strip structure 12 can be parallel to the width direction of the flat panel structure 11, and the length of the strip structure 12 can be the same as the width of the flat panel structure 11. In general, the length of the light bar 20 can be the same as the length of the strip structure 12, and therefore, the length of the light bar 20 is the same as the width of the flat panel structure 11. In the embodiment of the present disclosure, the light emitted by the light bar 20 is reflected by the inclined surface A1, and then exits from the side of the flat panel structure 11 away from the strip structure 12. In the case where the length of the light bar 20 is the same as the width of the flat panel structure 11, the light emitted from each position in the flat panel structure 11 has a relatively uniform brightness, effectively improving the uniformity of brightness and darkness at each position on the light exiting side of the backlight source.

In one or more embodiments according to the present disclosure, in order to increase the mechanical strength of the light guide plate, the strip structure 12 can be integrated with the flat panel structure 11.

Figure 5:
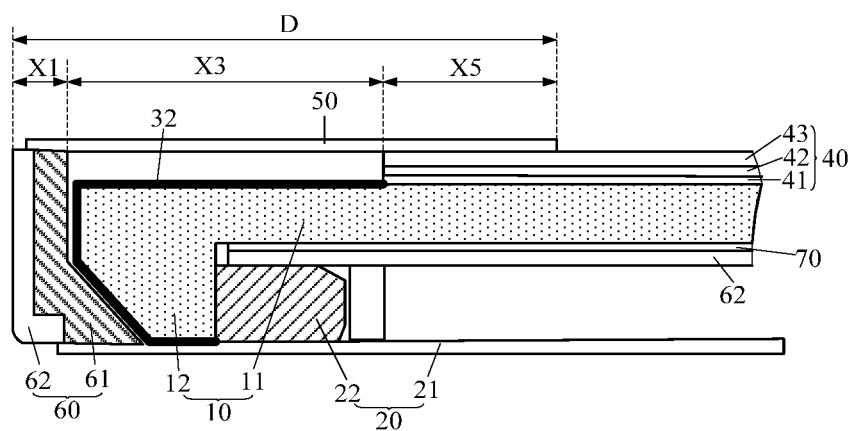
FIG. 5 is a schematic structural diagram of a backlight source provided in an embodiment of the present disclosure.

In the embodiment of the present disclosure, FIG. 5, which is a schematic structural diagram of a backlight source provided in an embodiment of the present disclosure, is provided. The backlight source further comprises an optical film 40, a light-shielding tape 50, a plastic-metal integral structure 60, and a reflective sheet 70.

The optical film 40 is disposed on a side of the flat panel structure 11 away from the strip structure 12. According to one or more embodiments of the present disclosure, the optical film 40 can include a diffusion sheet 41, a lower prism sheet 42, and an upper prism sheet 43 sequentially stacked on each other, wherein the diffusion sheet 41 is disposed on the flat panel structure 11.

The light-shielding tape 50 is disposed at an edge of a side of the optical film 40 away from the flat panel structure 11, and the light-shielding tape 50 is in contact with a region of the flat panel structure 11 that is not covered by the optical film 40. In the embodiment of the present disclosure, the light-shielding tape 50 needs to be in contact with a second reflective strip 32.

The reflective sheet 70 is disposed on a side of the flat panel structure 11 close to the strip structure 12.

Figure 6:
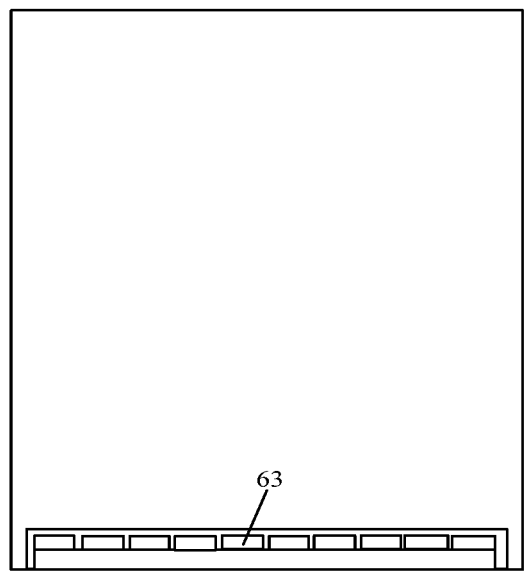
FIG. 6 is a schematic structural diagram of a plastic-metal integral structure provided in an embodiment of the present disclosure.
Figure 7:
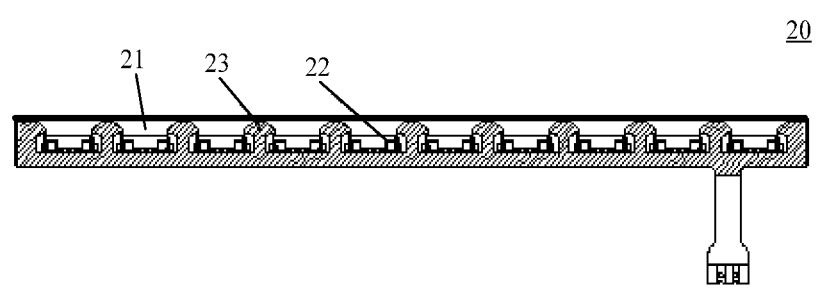
FIG. 7 is a schematic structural diagram of a light bar provided in an embodiment of the present disclosure.

The plastic-metal integral structure 60 can include a plastic frame 61 and a back plate 62, the plastic frame 61 being fixedly coupled to the back plate 62. The plastic-metal integral structure 60 is provided with a light bar mounting groove (not labeled in FIG. 5) and a light guide plate mounting groove (not labeled in FIG. 5), the light bar 20 being disposed in the light bar mounting groove, and the light guide plate 10 being disposed in the light guide plate mounting groove. For a better understanding of the structure of the light bar mounting groove of the plastic-metal integral structure 60, FIG. 6 is provided. FIG. 6 is a schematic structural diagram of the plastic-metal integral structure provided in an embodiment of the present disclosure. The light bar mounting groove 63 is used to bear the light bar. For example, as shown in FIG. 5 and FIG. 7, FIG. 7 is a schematic structural diagram of a light bar provided in an embodiment of the present disclosure, and the light bar 20 can include: a Flexible Printed Circuit (FPC) 21 and a plurality of light emitting diodes (LEDs) 22 disposed on the FPC 21. A double-sided tape 23 is provided on the FPC 21. After the light bar 20 is mounted in the light bar mounting groove 63, a fixed connection between the light bar 20 and the plastic-metal integral structure 60 can be realized by the double-sided tape 23. It should be noted that the light guide plate mounting groove of the plastic-metal integral structure 60 is located on a side away from the light bar mounting groove 63, and therefore the light guide plate mounting groove is not marked in FIG. 7.

In the related art of the present disclosure, at a position where the light bar is located, the display device includes an edge of the plastic-metal integral structure, a light bar, a light guide plate, an optical film (a diffusion sheet, a lower prism sheet and an upper prism sheet) on the light guide plate, and a light-shielding tape in the order from the outside to the inside in a direction parallel to the light guide plate. The light-shielding tape needs to cover the light bar, a light guiding distance of the light guide plate, a diffusion distance of the diffusion sheet, and assembly gaps thereof. Therefore, at the position where the light bar is located, since the bezel of the display device needs to shield the light-shielding tape and the edge of the plastic-metal integral structure, the width of the bezel of the display device is large, for example, about 5.0 mm or more. If the size of the screen of the display device is 6 inches, the ratio of the area of the light-exiting region of the backlight source to the total area of the light-exiting side of the backlight source is 93%.

In the embodiment of the present disclosure, as shown in FIG. 4, the display device needs to shield the light-shielding tape 50 and the edge of the plastic-metal integral structure 60. The distance D to be shielded at the position of the light bar 20 in the backlight source is the largest, and the distance D to be shielded satisfies the following equation: $D=X1+X3+X5$.

Wherein, X1 represents the width of the edge of the plastic-metal integral structure 60, and $X1 \leq 0.3$ mm.

X3 represents the light guiding distance of the light guide plate 10, and $X3 \leq 1.0$ mm.

X5 represents the width of the upper prism sheet 43 shielded by the light-shielding tape 50, and $X5 \leq 0.5$ mm.

The distance D to be shielded at the position where the light bar is located in the backlight source is $D=X1+X3+X5 \leq 1.8$ mm. If the size of the screen of the display device is 6 inches, the ratio of the area of the light-exiting region of the backlight source to the total area of the light-exiting side of the backlight source is 96.3%.

In the embodiment of the present disclosure, since the light bar 20 in the backlight source is located on a side away from the light exiting side of the light guide plate 10, the distance D to be shielded does not need to include the width of the light bar 20 and the assembly gap of the light bar 20. Since the light emitted by the light bar 20 needs to be reflected by the inclined surface A1 before entering the flat panel structure 11, the light transmission distance is increased, so that light rays emitted by various LEDs of the light bar 20 can be sufficiently mixed, and thereby the distance D to be shielded does not need to include the width of the diffusion sheet 41 shielded by the light-shielding tape 50 and the assembly gap of the diffusion sheet 41. Thus, the bezel of the display device in the embodiment of the present disclosure has a smaller width.

In summary, the backlight source provided in the embodiment of the present disclosure includes: a light guide plate and a light bar, the light guide plate includes a flat panel structure and a strip structure having an inclined surface, the light bar and the strip structure is disposed on the same side of the flat panel structure, and a light exiting surface of the light bar faces a side of the strip structure opposite to the inclined surface, so that the light emitted by the light bar can be reflected by the inclined surface, and the reflected light passes through the flat panel structure and then exits from the light exiting side of the light guide plate. Since the light bar in the backlight source is located on a side away from the light exiting side of the light guide plate, it is not required to shield the light bar of the display device, thereby effectively reducing the width of the bezel of the display device. In addition, since the light emitted by the light bar needs to be reflected before entering the flat panel structure, the light transmission distance is increased, so that light rays emitted by the light bar 20 can be sufficiently mixed. Accordingly, it is no longer necessary to shield the diffusion width of the diffusion sheet 41 and the assembly gap of the diffusion sheet, effectively reducing the width of the bezel of the display device.

An embodiment of the present disclosure further provides a display device, which can include a display panel and a backlight source, wherein the backlight source can be the backlight source shown in FIG. 1, FIG. 3 or FIG. 5, and the display panel can be a liquid crystal display panel. The display device can be a full-screen display device with a narrow bezel. For example, the display device can be a mobile phone, a tablet computer, a TV, a notebook computer, a digital frame, a navigator or any other product or component having display function.

An embodiment of the present disclosure further provides a method of assembling a backlight source. This method is used for assembling the backlight source shown in FIG. 4, and can include:

Step A: mounting a light bar in a light bar mounting groove in a plastic-metal integral structure.

Step B: assembling a reflective sheet, a light guide plate, an optical film, and a light-shielding tape in the light guide plate mounting groove.

It should be noted that, for the operation principle of the backlight source, reference can be made to the corresponding portion of the structural embodiment of the backlight source above, which will not be described in detail in this embodiment of the present disclosure.

The above disclosures are merely preferred embodiments of this disclosure, and is not limitation to this disclosure. Within spirit and principles of this disclosure, any modification, replacement, improvement and etc. shall be contained in the protection scope of this disclosure.

What is claimed is:

1. A backlight source, comprising: a light guide plate and a light bar;
  the light guide plate includes a flat panel structure and a strip structure having an inclined surface, the strip structure being disposed at an edge of one side of the flat panel structure, the inclined surface being connected to the edge of the flat panel structure and inclining toward the flat panel structure, and an angle between the inclined surface and a side of the strip structure away from the flat panel structure and parallel to the flat panel structure being an obtuse angle;
  the light bar and the strip structure are disposed on the same side of the flat panel structure, a light exiting surface of the light bar facing a side of the strip structure opposite to the inclined surface in a direction parallel to the flat panel structure;
  the backlight source further has an optical film, a light-shielding tape, a plastic-metal integral structure, and a reflective sheet;
  the optical film is disposed on a side of the flat panel structure away from the strip structure;
  the light-shielding tape is disposed at an edge of the optical film on a side thereof away from the flat panel structure, the light-shielding tape being in contact with a region of the flat panel structure that is not covered by the optical film;
  the plastic-metal integral structure is provided with a light bar mounting groove and a light guide plate mounting groove, the light bar being disposed in the light bar mounting groove, and the light guide plate being disposed in the light guide plate mounting groove; and
  the reflective sheet is disposed on a side of the flat panel structure adjacent to the strip structure.

2. The backlight source according to claim 1, wherein a first reflective strip is disposed on the inclined surface, and a second reflective strip is disposed on a side of the flat panel structure away from the strip structure.

3. The backlight source according to claim 2, wherein a third reflective strip is disposed on a surface of the strip structure that is away from the flat panel structure and is parallel to the flat panel structure, and a fourth reflective strip is disposed on a side surface of the flat panel structure adjacent to the inclined surface.

4. The backlight source according to claim 1, wherein a length direction of the light bar is parallel to a length direction of the strip structure.

5. The backlight source according to claim 1, wherein a length direction of the strip structure is parallel to a width direction of the flat panel structure, and a length of the strip structure is the same as a width of the flat panel structure.

6. The backlight source according to claim 1, wherein the strip structure is integral with the flat panel structure.

7. The backlight source according to claim 1, wherein the light exiting surface of the light bar abuts against the side of the strip structure opposite to the inclined surface in a direction parallel to the flat panel structure.

8. The backlight source according to claim 1, wherein the angle is 135 degrees.

9. A display device, including: a display panel and a backlight source, the backlight source comprises a light guide plate and a light bar;
  the light guide plate includes a flat panel structure and a strip structure having an inclined surface, the strip structure being disposed at an edge of one side of the flat panel structure, the inclined surface being connected to the edge of the flat panel structure and inclining toward the flat panel structure, and an angle between the inclined surface and a side of the strip structure away from the flat panel structure and parallel to the flat panel structure being an obtuse angle;
  the light bar and the strip structure are disposed on the same side of the flat panel structure, a light exiting surface of the light bar facing a side of the strip structure opposite to the inclined surface in a direction parallel to the flat panel structure;
  the backlight source further has an optical film, a light-shielding tape, a plastic-metal integral structure, and a reflective sheet;
  the optical film is disposed on a side of the flat panel structure away from the strip structure;
  the light-shielding tape is disposed at an edge of the optical film on a side thereof away from the flat panel structure, the light-shielding tape being in contact with a region of the flat panel structure that is not covered by the optical film;
  the plastic-metal integral structure is provided with a light bar mounting groove and a light guide plate mounting groove, the light bar being disposed in the light bar mounting groove, and the light guide plate being disposed in the light guide plate mounting groove; and
  the reflective sheet is disposed on a side of the flat panel structure adjacent to the strip structure.

10. The display device according to claim 9, wherein a first reflective strip is disposed on the inclined surface, and a second reflective strip is disposed on a side of the flat panel structure away from the strip structure.

11. The display device according to claim 10, wherein a third reflective strip is disposed on a surface of the strip structure that is away from the flat panel structure and is parallel to the flat panel structure, and a fourth reflective strip is disposed on a side surface of the flat panel structure adjacent to the inclined surface.

12. The display device according to claim 9, wherein a length direction of the light bar is parallel to a length direction of the strip structure.

13. The display device according to claim 9, wherein a length direction of the strip structure is parallel to a width direction of the flat panel structure, and a length of the strip structure is the same as a width of the flat panel structure.

14. The display device according to claim 9, wherein the strip structure is integral with the flat panel structure.

15. The display device according to claim 9, wherein the light exiting surface of the light bar abuts against the side of the strip structure opposite to the inclined surface in a direction parallel to the flat panel structure.

16. The display device according to claim 9, wherein the angle is 135 degrees.

* * * * *